United States Patent [19]

Kasper et al.

[11] Patent Number: 4,496,183
[45] Date of Patent: Jan. 29, 1985

[54] VIBRATION-DAMPED WHEEL FOR RAIL VEHICLES

[75] Inventors: Willi Kasper; Helmut Licht, both of Bochum; Erwin Raquet, Witten; Jürgen Schneider, Bochum, all of Fed. Rep. of Germany

[73] Assignee: Krupp Stahl Aktiengesellschaft, Bochum, Fed. Rep. of Germany

[21] Appl. No.: 293,468

[22] Filed: Aug. 17, 1981

[30] Foreign Application Priority Data

Sep. 4, 1980 [DE] Fed. Rep. of Germany ....... 3033246

[51] Int. Cl.³ .................... B60B 17/00; B60B 19/00; F16F 15/10
[52] U.S. Cl. .......................... 295/7; 74/443; 105/452; 295/1; 295/11; 301/6 WB
[58] Field of Search ............ 74/432, 443; 295/1, 295/7, 11; 105/452; 301/5 B, 5 BA, 6 WB

[56] References Cited

U.S. PATENT DOCUMENTS

| | | | |
|---|---|---|---|
| 228,430 | 6/1880 | Woodbury | 295/7 |
| 1,023,574 | 4/1912 | Lindblad | 295/11 |
| 1,689,052 | 10/1928 | Rogers | 295/7 |
| 1,695,529 | 12/1928 | Brownyer | 295/7 X |
| 1,782,285 | 11/1930 | Bourdon | 295/11 |
| 2,605,132 | 7/1952 | Watter | 295/7 |
| 2,861,471 | 11/1958 | Kronenberg | 301/5 B X |
| 3,017,224 | 1/1962 | Palmer | 301/5 B |
| 3,057,220 | 10/1962 | Parr | 74/443 |
| 3,080,771 | 3/1963 | Baldwin | 295/7 |
| 4,353,586 | 10/1982 | Raquet et al. | 295/7 |

FOREIGN PATENT DOCUMENTS 854367 11/1952 Fed. Rep. of Germany .......... 295/7

Primary Examiner—David A. Scherbel
Assistant Examiner—Howard Beltran
Attorney, Agent, or Firm—McAulay, Fields, Fisher, Goldstein & Nissen

[57] ABSTRACT

A rail wheel has in one of its rim surfaces, preferably the inner one, a circumferential undercut groove. Vibration-damping elements are connected to the wheel by means of screws which either engage in the undercut groove via appropriately shaped heads, or are threaded into wedges lodged in the groove.

20 Claims, 6 Drawing Figures

VIBRATION-DAMPED WHEEL FOR RAIL VEHICLES

BACKGROUND OF THE INVENTION

The present invention relates to a wheel for rail vehicles, and more particularly to a vibration-damped wheel for rail vehicles.

A wheel of this general type is already known. It includes resonance absorbers which are secured via screw bolts on a ring which in turn is shrink-fitted into an annular recess of the wheel. This manner of connecting the resonance absorbers to the wheel has the advantage that the wheel need not be weakened by mounting holes. On the other hand, it can be used only with wheels which are either not subject to braking or are braked with the aid of disk brakes. If the conventional type of block-brakes is used, the wheel body tends to heat up and expand sufficiently for the shrink fit of the ring to become loosened.

SUMMARY OF THE INVENTION

It is, therefore, a general object of the present invention to overcome the disadvantages of the prior art.

A more particular object of the invention is to provide an improved vibration-damped rail-vehicle wheel of the general type disclosed in the aforementioned German Allowed Application, but with the resonance absorbers so mounted that the wheel can be used with block-type brakes.

Pursuant to these objects, and still others which will become apparent hereafter, one aspect of the invention resides in a vibration-damped rail wheel, having a wheel body provided with at least one circumferential undercut groove; and at least one vibration damping element and screws for connecting the element to the undercut groove at a selectable circumferential location of the wheel.

By having the annular groove in the wheel extending in a circumferential direction, the stresses which build up in the wheel during block braking and which are substantially greater in the circumferential direction than in a radial and an axial direction, are fully taken into account. The highest stresses extend parallel to the groove so that at the transition radii at the body of the groove only a stress concentration factor of about 1.2 is observed. Compared to this, the use of bores or of tapped bores in the wheel for mounting the resonance absorbers, results in stress concentration factors of 2 to 3. The reason for this is that bores or tapped bores intersect the circumferential thermal stresses.

Giving a continuous conventional braking action of about 20 minutes at a brake effectiveness of 40 KW, thermal stresses are found in the region of the circumferential groove of about 200 to 300 Newton/mm$^2$ in circumferential direction, but only about 20–30 Newton/mm$^2$ in the axial and radial directions.

Given the symmetrical shape of the wheel, a further advantage of the invention resides in the fact that the circumferential groove offers the posibility to mount the resonance absorbers at any desired circumferential location. This permits one to accommodate the resonance absorbers according to the vibratory maximum, but on the other hand to so mount them that wheel imbalances are eliminated. The connection to the wheel remains intact even if the wheel is heated up (e.g. due to braking), so that the damping effect remains in force.

According to one embodiment of the invention it may be advantageous to provide the circumferential groove on the side of the rim. The reason for this is that here even lower stress concentration factors and a lesser heat loading will occur.

Various possibilities offer themselves for mounting in the undercut groove. The screws or screw bolts may have hammer heads or similar configurations which can engage in the undercut of the groove. Again, one-piece or spreadable mounting members may be located in the undercut groove and the bolts or screw bolts are threaded into these. If hammer heads are used, they must be placed in requisite orientation to be inserted into the groove and are thereafter turned so that they cannot slip out of the groove again. With other head shapes, the groove may have to be enlarged at one location to allow for the insertion of the heads.

It is evidently desirable to protect the resonance absorbers, especially the damping material, against the heat generated by braking. To achieve this, a thermal barrier, especially in form of ribs or a socket, may be incorporated between the base of the resonance absorber and its contact surface at the wheel.

The invention will hereafter be described with reference to two exemplary embodiments as illustrated in the drawing. However, it should be clearly understood that these embodiments are for purposes of explanation only and are not to be considered as limiting the invention in any of its aspects.

DESCRIPTION OF PREFERRED EMBODIMENTS

Figure 1:
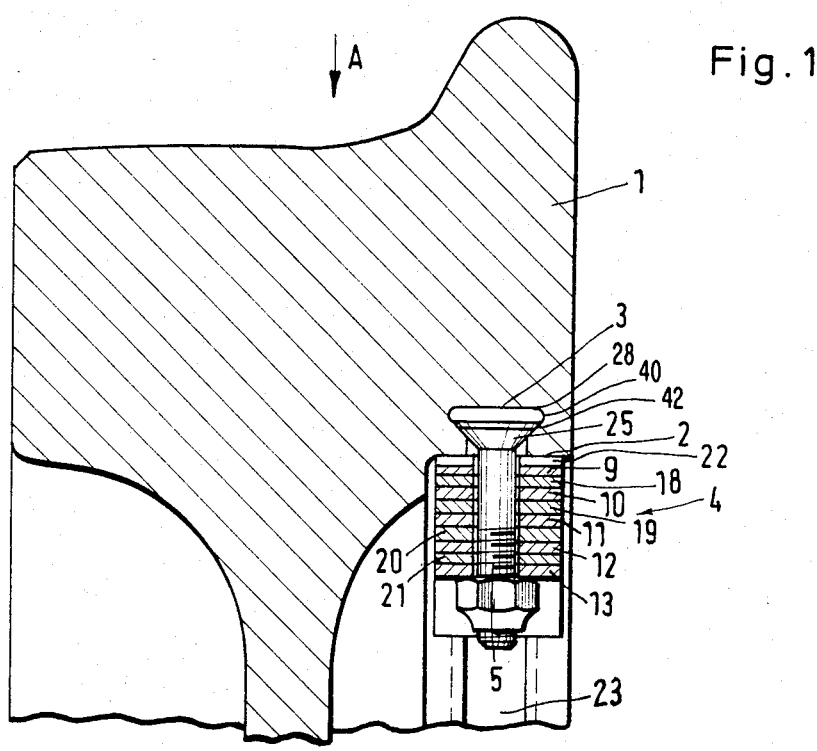
FIG. 1 is a fragmentary radial section of a rail wheel according to one embodiment of the invention.
Figure 2:
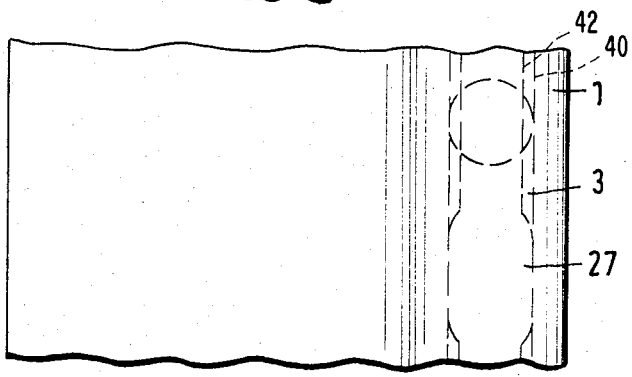
FIG. 2 is a detail of FIG. 1, seen in the direction of arrow A in FIG. 1.
Figure 3:
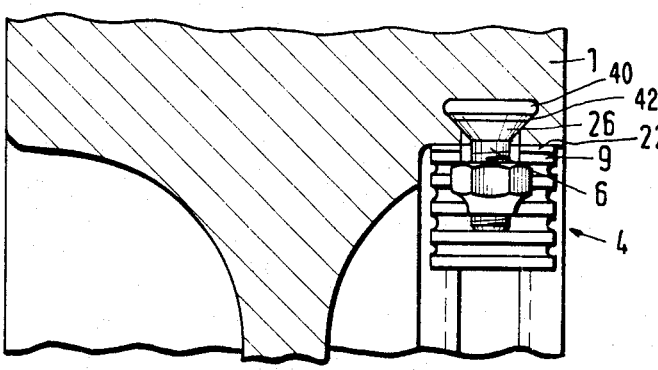
FIG. 3 is a view similar to FIG. 1, but showing a circumferentially offset portion of the FIG. 1 wheel.

Discussing firstly FIGS. 1–3 it will be seen that the inner side of wheel 1 is formed with an abutment-forming recess (turning) and a circumferential undercut groove 3 of V-cross-section. Resonance absorbers 4 (known per se) are connected to the wheel 1 by three circular headed screw bolts 5, 6 having wedgeshaped hammer heads 25, 26 which engage in the undercut groove 3. The resonance absorbers 4 have a base shaped as a base plate 9 which is supported against the abutment face 2 of the wheel 1.

The undercut groove 3 is formed from a wide base 40 and an inwardly extending partially trapezoidally-shaped cylindraceous side portions 42 so that the base 40 of the groove 3 is wider than the slit formed by the trapezoidally-shaped side 42 in section so that the head of the screw bolt is locked in the groove.

Figure 4:
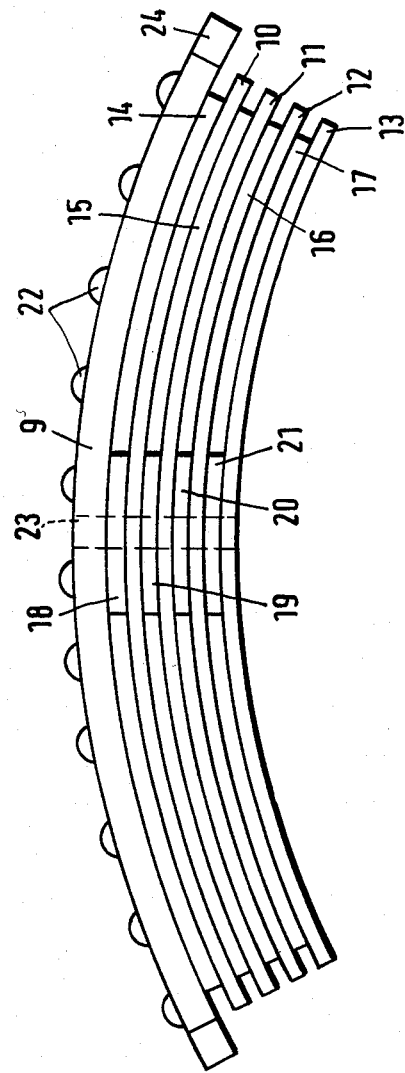
FIG. 4 is a side view, illustrating a resonance absorber for use with the wheel of FIG. 1.

Each of the resonance absorbers 4 is composed of the aforementioned base plate 9 and several plate-shaped tongues or layers 10, 11, 12, 13 which are separated from one another by intermediate inserts 14, 15, 16, 17 (see FIG. 4) of damping material. In the center region the base plate 9 and the tongues 10, 11, 12, 13 are rigidly connected to one another and to spacer plates 18, 19, 20 by welding or riveting. Distributed over the underside of the base plate 9 are ribs 22 (see FIG. 4) which have the two-fold purpose of providing good coupling to the wheel 1 and to act as a heat barrier.

Provided in the middle region of each resonance absorber 4 is a throughgoing bore 23 for the screw bolt 5. The overhanging edges of the base plate 9 are provided with semi-circular bores 24 into which the screw-bolts 6 engage.

The resonance absorbers 4 are mounted on the wheel 1 in such a manner that first the screw bolt 5 is turned (90°) until its hammer head 25 can be inserted into the groove 3. Should the head 25 be of circular outline, an appropriate enlargement 27 would have to be provided at an appropriate location of the groove 3 so as to allow for insertion of the head. In either case, the resonance absorber 4 is then shifted to the desired circumferential location and secured in the groove 3, with the screw bolt 5 and the outer screw bolts 6 which also have hammer heads 26, being tightly drawn against the abutment surface 2.

When the wheel undergoes heating due to braking, the stresses occurring at the base of the V-shaped groove 3 are not excessively high. Even at the rounded points 28, where the relatively highest stresses occur, a stress concentration factor of only 1.2 is observed.

Figure 5:
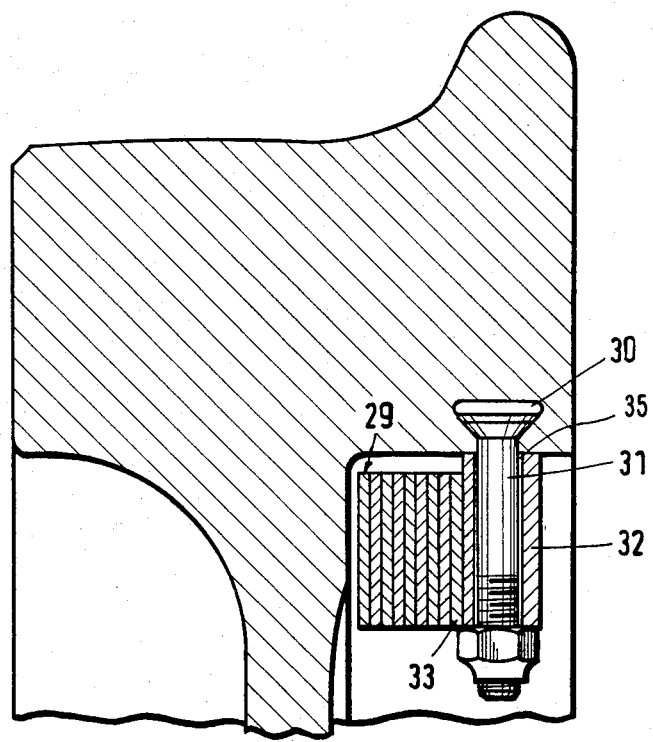
FIG. 5 is a view analogous to FIG. 1, but illustrating another embodiment of the invention.
Figure 6:
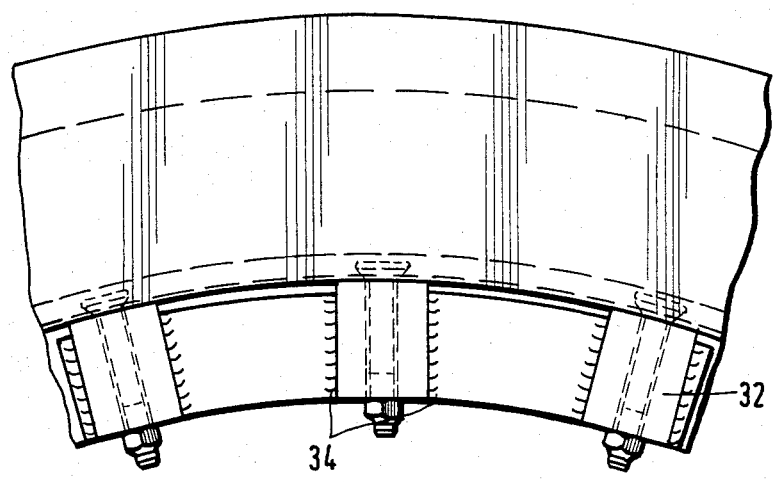
FIG. 6 is a fragmentary side view of the wheel in FIG. 5.

The embodiment of FIGS. 1-4 is intended for vibration damping of radial vibrations. By contrast, the embodiment in FIGS. 5 and 6 serves to dampen axial vibrations.

The difference between the two embodiments is in the orientation of the tongues 29 of the resonance absorber 4 which, however, also requires that their coupling to the wheel 1 is somewhat different. A V-shaped groove 30 is again provided in which the resonance absorbers 29 are secured by means of screws 31. In addition, however, three blocks 32 are provided to which the baseplate 33 is welded at points 34. The shape of the blocks 32 is such that the resonance absorbers 29 have a certain freedom of play (movement) relative to the wheel. The overhanging portions of the blocks 32 correspond in their function to the ribs 22 of the FIGS. 1-4 embodiment. These blocks 32 have an opening 35 through which screws 31 pass and are in the form of a socket for the overhanging portions of the blocks 32.

Although the invention has hereinbefore been described with reference to two specific embodiments, changes and modifications will occur to those skilled in the art. All these are intended to be encompassed within the scope of the appended claims.

What is claimed is:

1. A vibration-damped wheel, comprising:
 a wheel body formed with an abutment forming recess and having a continuous circumferential undercut groove in the rim of the rail wheel having greater width at the interior bottom of the groove than at the top;
 said groove being concentric with the wheel body axis;
 at least one vibration-damping block element for connection to said undercut groove distributed over the length of said groove; and
 screw means having their heads inserted in the groove for securely spacing and directly connecting said undercut groove thereof.

2. A vibration-damped rail wheel as defined in claim 1, wherein said groove is oriented in a vertical plane and said V-cross-section includes at least one enlargement for insertion therethrough of said heads and spaced portions for engaging said heads, said orientation of said groove being such that said screw means are radial with respect to the axis of said rail wheel.

3. A wheel as claimed in claim 1, wherein each of said vibration-damping block elements is composed of mass-members and damping-material members, external of said groove means, and tuned to the inherent wheel frequencies to be damped.

4. A wheel as defined in claim 1, wherein said screw means further comprises wedge members accommodated in said undercut groove and a threaded portion connected with said wedge members.

5. A wheel as claimed in claim 1, wherein said groove has a V-cross-section which includes at least one enlargement for insertion therethrough of said heads and spaced portions for enlarging the underside of said heads.

6. A vibration-damped wheel as claimed in claim 1, wherein the elements are positioned at selectable locations so that wheel imbalances are eliminated.

7. A vibration-damped wheel as claimed in claim 6, wherein said undercut groove is of V-cross-section.

8. A wheel as claimed in claim 1, wherein each of said vibration-damping block elements has a base shaped as a base plate and a contact face engageable therewith.

9. A wheel as claimed in claim 8, including a heat barrier interposed between said base plate and said contact face.

10. A wheel as defined in claim 1, wherein each said vibration-damping element has a base shaped as a base plate and a contact face engageable therewith; and a heat barrier interposed between said base plate and said contact face.

11. A wheel as defined in claim 10, wherein said heat barrier includes ribs distributed on the underside of said base plate.

12. A vibration-damped wheel comprising:
 a wheel body formed with an abutment-forming recess having one continuous circumferential undercut groove of V-cross-section formed therein concentric with the wheel body axis;
 several vibration-damping blocks for connection to said undercut groove at selectable circumferential locations so that wheel imbalances are eliminated; and
 screw means having heads inserted and held in said groove for securely spacing and directly connecting said damping blocks directly to said undercut groove of said wheel with said connecting means being lockable thereto at said circumferential locations of said wheel while maintaining said vibration-damping blocks external of said undercut groove to mitigate tension concentration caused by heat and expansion of the wheel.

13. A wheel as defined in claim 12, wherein said groove has an opening thereto narrower than the base of said groove provided on the inner side of the wheel.

14. A wheel as defined in claim 12, wherein said V-cross-section includes at least one enlargement for insertion therethrough of said heads and spaced portions for engaging the underside of said head.

15. A vibration-damped rail wheel as defined in claim 12, wherein said groove is oriented in a vertical plane and said V-cross-section includes at least one enlargement for insertion therethrough of said heads and spaced portions for engaging said heads, said orientation of said groove being such that said screw means are radial with respect to the axis of said rail wheel.

16. The vibration-damped wheel as claimed in claim 12, wherein said heads are circular.

17. A wheel as defined in claim 12, wherein each said vibration-damping element has a base shaped as a base plate and a contact face engageable therewith; and a heat barrier interposed between said base plate and said contact face.

18. A wheel as defined in claim 17, wherein said V-cross-section includes at least one enlargement for insertion therethrough of said heads and spaced portions for engaging the underside of said heads.

19. A wheel as defined in claim 17, wherein said groove has an opening thereto narrower than the base of said groove provided on the inner side of the wheel.

20. A wheel as defined in claim 17, wherein said heat barrier includes ribs distributed on the underside of said base plate.

* * * * *